United States Patent [19]
Parzefall et al.

[11] Patent Number: 4,544,212
[45] Date of Patent: Oct. 1, 1985

[54] LINEAR ROLLING BEARING FOR RECTANGULAR BAR

[75] Inventors: Walter Parzefall, Bubenreuth; Wolfgang Pflügner; Wolfgang Steinberger, both of Herzogenaurach, all of Fed. Rep. of Germany

[73] Assignee: INA Walzlager Schaeffler KG, Fed. Rep. of Germany

[21] Appl. No.: 691,165

[22] Filed: Jan. 14, 1985

[51] Int. Cl.⁴ ................... F16C 29/04; F16C 1/28
[52] U.S. Cl. ..................... 308/6 R; 74/473 R; 308/3 R; 308/4 R
[58] Field of Search ........... 308/6 R, 6 B, 6 A, 3 R, 308/3 A, 4 R, 4 C; 74/473 R

[56] References Cited

U.S. PATENT DOCUMENTS

| | | | |
|---|---|---|---|
| 2,854,078 | 9/1958 | Conner | 308/6 B |
| 3,003,827 | 10/1961 | Hentschke | 308/6 B |
| 3,143,758 | 8/1964 | Dunham | 308/4 R X |
| 3,631,731 | 1/1972 | Hawtree | 308/6 R X |
| 4,412,704 | 11/1983 | Gagnebin | 308/3 R X |

FOREIGN PATENT DOCUMENTS 77012 4/1983 European Pat. Off. ............ 308/6 R

Primary Examiner—Stuart S. Levy
Assistant Examiner—Thomas R. Hannon
Attorney, Agent, or Firm—Bierman, Peroff & Muserlian

[57] ABSTRACT

A rolling bearing for longitudinal movements of limited slide path for guiding a rectangular cross-section bar comprising an outer element, an inner element and rows of balls rolling between said elements, the outer element on whose bore wall the balls roll being insertable into a cylindrical housing bore and the inner element, being provided with straight, axially extending inner ball races and at least partially surrounding the rectangular cross-section bar, bears against the bar by the back of its ball races, characterized in that the outer element is formed as a cylindrical tube section and the inner element is connected to the bar to form a structural unit so that it is retained on the bar in its position required for operation and a cage retaining the balls at the inner element is provided which cage forms a structural unit with the inner element.

13 Claims, 4 Drawing Figures

4,544,212

LINEAR ROLLING BEARING FOR RECTANGULAR BAR

STATE OF THE ART

Rolling bearings for longitudinal movements of limited slide path for guiding a bar of rectangular cross-section consisting of an outer element, an inner element, and rows of balls rolling between them, where the outer element, on whose bore wall the balls roll, is insertable into a cylindrical housing bore, and the inner element, which is provided with straight, axially extending inner ball races and which surrounds the bar at least partially, bears by the back of its ball races against the bar are known from EP-OS 00 77 012 the outer element, the inner element and the balls of the known bearing forming a self-retaining structural unit. The inner element of this bearing has a rectangular bore essentially corresponding to the cross-section of the bar but this bearing, which actually works quite satisfactorily, presents a number of disadvantages.

In applications in which the bar (as in the case of the suspension of a gear-shift bar in the housing of a motor vehicle gear box)is guided by means of two bearings placed in two spaced housing bores and where the procedure for assembly must be that first the two bearings are mounted in the respective housing bores and then the gear-shift bar is introduced into the bearings, the known design can be made use of only at increased cost because, due to the rectangular cross-section of the bore of the inner element and of the bar, the latter can be installed in the bearings only if the two bearing are exactly aligned with respect to their angular position, for which purpose either appropriate stops or the like must be provided between the bearing and housing or assembly devices are required, in either case time and cost-intensive measures.

In the said applications, it is a further disadvantageous fact that the bar can be introduced into the inner element only by exertion of a considerable assembly force, with the inner element being pushed into its end position in the direction of the assembly force, so that exact positioning of the inner element on the bar is possible only with difficulties.

OBJECTS OF THE INVENTION

It is an object of the invention to provide a bearing of the said type which, even in cases in which the rolling bearings intended to guide the bar must be installed in the housing before the bar, makes it unnecessary to use assembly devices or other measures to assure a certain angular position of the two bearings with respect to each other, which requires no increased forces for assembly, and whose inner element can be positioned on the bar in its position corresponding to the operating state in a simple manner.

These and other objects and advantages of the invention will become obvious from the following detailed description.

THE INVENTION

The novel rolling bearing of the invention for longitudinal movements of limited slide path for guiding a rectangular cross-section bar comprises an outer element, an inner element and rows of balls rolling between said elements, the outer element on whose bore wall the balls roll being insertable into a cylindrical housing bore and the inner element, being provided with straight, axially extending inner ball races and at least partially surrounding a rectangular cross-section bar, bears against the bar by the back of its ball races, characterized in that the outer element is formed as a cylindrical tube section and the inner element is connected to the bar to form a structural unit so that it is retained on the bar in its position required for operation and a cage retaining the balls at the inner element is provided which cage forms a structural unit with the inner element.

The problems of the prior art are solved in that the outer element is formed as a cylindrical tube section, and that, for one thing, the inner element is connected with the bar as a structural unit so that it is retained on the bar in its position as required for operation of the bearing and for another, a cage is provided which retains the balls at the inner element which cage forms a structural unit with the inner element.

The entire rolling bearing with the exception of its outer element can be arranged on the bar as a self-retaining unit in its position corresponding to the operating state and can be introduced into the outer element contained in the housing without any appreciable assembly force, and because of the cylindrical form of the outer elements moreover any measures to assure a certain angular position of the outer element or of the rolling bearing in the housing can be dispensed with so that, apart from the lower manufacturing costs, the cost of assembly is considerably reduced as compared with the known design.

Variations of the invention provide that the bar is supported on three sides by one ball row for each side, or on two opposite sides by two-ball rows for each side. One embodiment of the invention provides that the tube section is formed as a thin-walled sleeve drawn from sheet metal, with the possibility that according to another embodiment a one-piece flange directed radially outward is provided at one end of the sleeve. According to another variation to further facilitate the assembly, the sleeve has at its one end a one-piece conical enlargement which merges at its outer edge into a collar extending axially toward the other end of the sleeve, the length of the collar being greater than the length of the conical enlargement projected onto the longitudinal axis of the sleeve.

For the formation of the preassembled structural unit between inner element and bar, the inner element in another embodiment engages by means of an inwardly directed projection into a corresponding recess in the bar, the projection being formed, according to one form of the invention, as an elastically resilient tongue. Another form of the invention provides that the inner element is equipped with stops to limit the cage excursion, this measure serving at the same time to form a structural unit between cage and inner element.

Another variation of the invention provides that the inner element is formed as an elastically resilient sheet metal element whose cross-sectional contour essentially corresponds to the outer contour of the bar and which bears by the back of its ball races against the bar under prestress, with the possiblity that for one thing the flexibility of the inner element is increased by the fact that it has an axially extending continuous slot, and, for another, the projection ano the stops are integrally formed on the inner element in one piece to lower the manufacturing cost. Lastly, one embodiment of the invention provides that the cage is formed as an elastically resilient, substantially U-shaped element embracing the inner element.

Referring now to the drawings.

Figure 2:
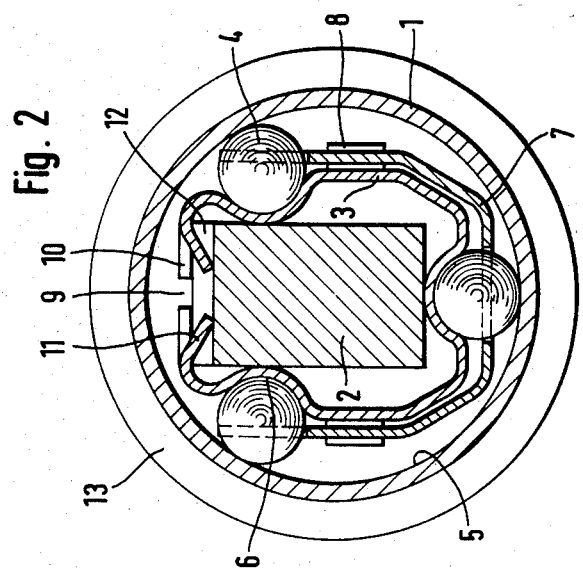
FIG. 2 is a transverse cross-section along line II—II in FIG. 1.
Figure 1:
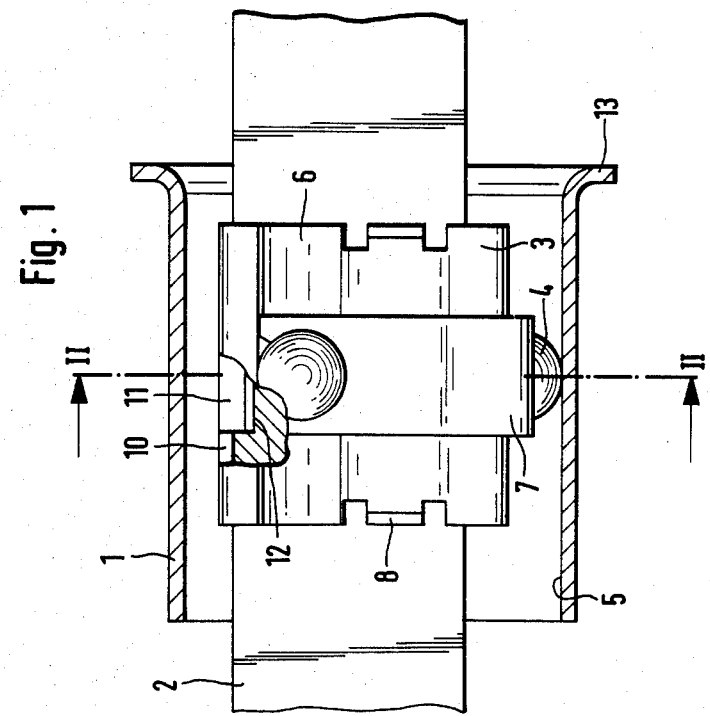
FIG. 1 is a longitudinal cross-section through a bearing of the invention.

In FIGS. 1 and 2, a rolling bearing of the invention is comprised of a thin-walled cylindrical sleeve 1 as the outer element, a thin-walled inner element 3 embracing a rectangular bar 2, and three rows of balls rolling between sleeve 1 and the inner element 3, each with one ball 4. While the balls 4 roll on the bore wall 5 of sleeve 1 without special races being provided, inner element 3 is provided with ball races 6 which are arranged so that bar 2 is supported on three sides. Balls 4 are retained at the inner element 3 in radial direction by a U-shaped cage 7 embracing inner element 3, and radially outwardly directed stops 8 for limiting the cage excursion are integrally formed at the ends of the inner element 3 so that cage 7, balls 4 and inner element 3 form a structural unit.

The inner element 3 whose cross-sectional contour is substantially adapted to the outer contour of bar 2 is provided with a continuous, axially extending slot 9 and bears by the backs of its ball races 6 and its legs 10 adjacent to slot 9 against the corresponding side faces of bar 2 under prestress. Legs 10 of inner element 3 are incised to form tongues 11 and the inwardly bent tongues 11 engage elastically into a cross groove 12 cut in bar 2 so that the inner element 3 can be snapped onto bar 2 in its position corresponding to the operating state of the rolling bearing. Integrally formed on sleeve 1 is a radially outwardly directed flange 13 which serves as a stop when sleeve 1 is pressed axially into a corresponding housing bore.

The procedure of assembling the bearing may expediently be that the structural unit consisting of inner element 3, balls 4 and cage 7 is in turn snapped onto bar 2 to form a preassembled unit which can then be introduced into sleeve 1 disposed in the housing bore in any desired appropriate angular position without requiring any measures to assure a specific angular position also of sleeve 1, since because of its cylindrical form, the above mentioned presassembled unit can be introduced into sleeve 1 in any desired angular position.

Figure 4:
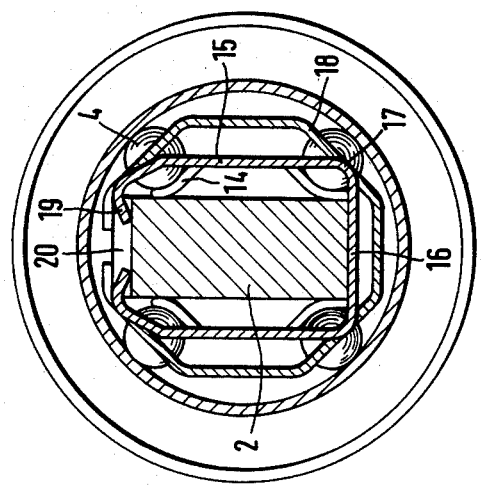
FIG. 4 is a transverse cross-section along line IV—IV in FIG. 3.
Figure 3:
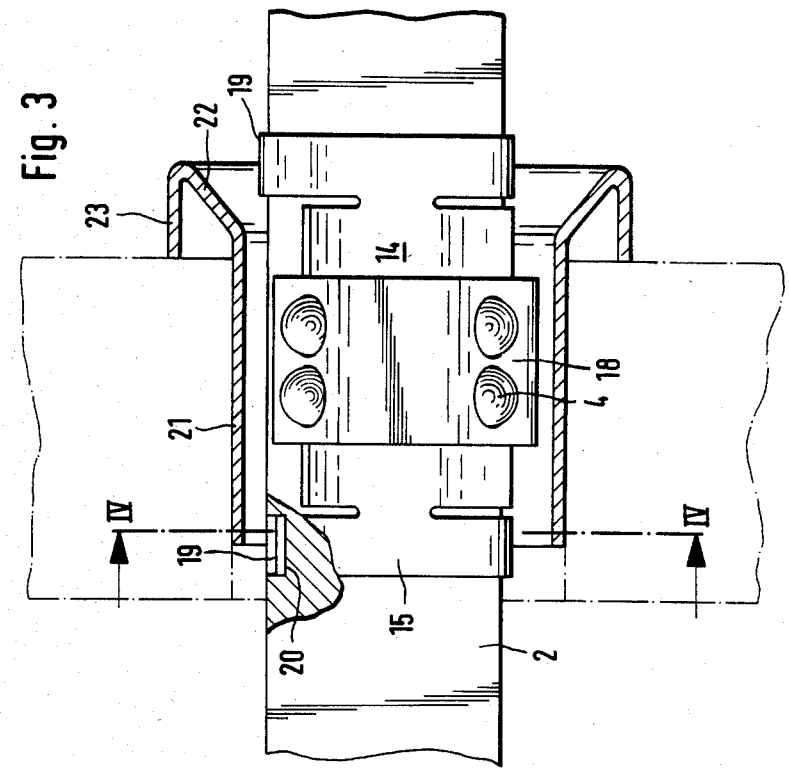
FIG. 3 is a longitudinal cross-section through a second embodiment of the invention.

Another design of a rolling bearing of the invention is shown in FIGS. 3 and 4 where four ball rows of two balls 4 each are provided with pairs of ball races supporting bar 2 on two opposite sides. As FIGS. 3 and 4 show, the inner element 14 provided with ball races has integrally formed on it at both ends clasps 15 which are connected by narrow bands to the section of the inner element 14 that carries the ball races. The cross-sectional contour of the clasps 15 differs from the substantially U-shaped cross-sectional contour of the section of the inner element 14 that carries the ball races and that abuts on bar 2 by the back sides of its ball races as well as by its base side 16, so that in their regions 17 adjacent to the ball races, clasps 15 project radially outward over them to form stops to limit the axial excursion of cage 18, and so that the ends 19 of clasps 15 engage bar 2 from behind radially retaining inner element 14 on bar 2 and in addition, ends 19 of one of clasps 15 resiliently engage into a corresponding cross-groove 20 in bar 2 for axial retention of inner element 14 on bar 2.

FIG. 3 shows that the outer element formed as a clindrical sleeve 21 and inserted in a housing bore indicated by dash-dot lines has at its one end a conical enlargement 22 which merges at its outer edge into a collar 23 which extends axially towards the other end of sleeve 21 and which bears against the housing wall also indicated in dash-dot lines and which serves as a stop when sleeve 21 is pressed into the housing bore. The length of collar 23 is greater than the length of conical enlargement 22 projected onto the longitudinal axis of sleeve 21, thereby ensuring that as sleeve 21 is being pressed into the housing bore, collar 23 makes contact on the housing wall before conical enlargement 22 can be deformed by the housing bore.

Various modifications of the bearing of the invention may be made without departing from the spirit or scope thereof and it is to be understood that the invention is intended to be limited only as defined in the appended claims.

What we claim is:

1. A rolling bearing for longitudinal movements of limited slide path for guiding a rectangular cross-section bar comprising an outer element, an inner element and rows of balls rolling between said elements, the outer element on whose bore wall the balls roll being insertable into a cylindrical housing bore and the inner element, being provided with straight, axially extending inner ball races and at least partially surrounding the rectangular cross-section bar, bears against the bar by the back of its ball races, characterized in that the outer element is formed as a cylindrical tube section and the inner element is connected to the bar to form a structural unit so that it is retained on the bar in its position required for operation and a cage retaining the balls at the inner element is provided which cage forms a structural unit with the inner element.

2. A rolling bearing of claim 1 wherein the bar is supported on three sides by one ball row for each side.

3. A rolling bearing of claim 1 wherein the bar is supported on two opposite sides by two ball rows for each side.

4. A rolling bearing of claim 1 wherein the cylindrical tube section is formed as a thin-walled sleeve drawn from sheet-metal.

5. A rolling bearing of claim 4 wherein at one end of the sleeve, a radially outwardly directed flange is provided, being formed integrally with the sleeve.

6. A rolling bearing of claim 4 wherein at one end the sleeve has a conical enlargement formed integrally therewith which merges at its outer edge into a collar extending axially towards the other end of the sleeve, the collar length being greater than the conical enlargement length projected onto the longitudinal axis of the sleeve.

7. A rolling bearing of claim 1 wherein the inner element engages by means of an inwardly directed projection into a corresponding recess in the bar.

8. A rolling bearing of claim 7 wherein the projection is in the form of an elastically resilient tongue.

9. A rolling bearing of claim 1 wherein the inner element is provided with stops for limiting cage excursion.

10. A rolling bearing of claim 1 wherein the inner element is formed as an elastically resilient sheet metal element with a cross-sectional contour essentially corresponding to the bar outer contour and bears by the back of its ball races against the bar under prestress.

11. A rolling bearing of claim 10 wherein the inner element has an axially extending continous slot.

12. A rolling bearing of claim 10 wherein a projection engaging into a recess in the bar and stops limiting the excursion of the cage are formed integrally with the inner element.

13. A rolling bearing of claim 1 wherein the cage is an elastically resilient, essentially U-shaped element embracing the inner element.

* * * * *

UNITED STATES PATENT AND TRADEMARK OFFICE
CERTIFICATE OF CORRECTION

PATENT NO. : 4,544,212

DATED : Oct. 1, 1985

INVENTOR(S) : Walter Parzefall, Wolfgang Pflugner and Wolfgang Steinberger

It is certified that error appears in the above-identified patent and that said Letters Patent is hereby corrected as shown below:

On the title page the following should be inserted:

-- [30] Foreign Application Priority Data

Fed. Republic of Germany [DE] 3402523....Jan. 26, 1984 --

Signed and Sealed this

Eleventh Day of February 1986

[SEAL]

Attest:

DONALD J. QUIGG

Attesting Officer

Commissioner of Patents and Trademarks